United States Patent Office 2,785,752
Patented Mar. 19, 1957

2,785,752

TREATMENT OF SILICEOUS GEOLOGICAL FORMATIONS WITH FLUOPHOSPHORIC ACID

Donald C. Bond and Allyn T. Sayre, Jr., Crystal Lake, Ill., assignors to The Pure Oil Company, Chicago, Ill., a corporation of Ohio No Drawing. Application September 22, 1953, Serial No. 381,739

5 Claims. (Cl. 166—42)

This invention relates to a method for augmenting the production of fluids from siliceous geological formations traversed by a borehole. It is more specifically concerned with enhancing the effectiveness of the hydraulic fracturing technique employed in developing within the formation a plurality of fractures extending radially from the borehole which function as channels in the gathering of fluids from subterranean reservoirs.

While on occasion fluids will drain naturally from wells penetrating fluid-bearing geological formations, more frequently the lithologic characteristics of these reservoirs require that the reservoirs be treated to increase the extent of the drainage channels and permit the reservoir fluid to flow more readily through the modified interstitial spaces. A number of methods have been used to treat formations to effect this objective. The procedure which was initially developed involved the use of explosives, such as nitroglycerine and other special oil well explosives. Although this method still has its adherents, it has certain economic disadvantages due to the expense and time required to remove the accumulation of detritus resulting from the shattering effect of the explosive. Production engineers who were unwilling to go to this added expense discovered that the treatment of the formation with an acid served to increase the drainage efficiency of the formation by increasing the permeability of formations contacted by the acidizing reagent. Therefore, however, producing formations which fail to respond to acid treatment because of insoluble components which insulate the soluble portions or formation of precipitates. Accordingly, a more current development has been the application of hydraulic principles in the treatment of reservoir rocks to reopen and interconnect the natural flow system of the reservoir in order to secure maximum recovery. It has been found that if a hydraulic fluid is introduced into a formation, sufficient pressure may be exerted by means of this hydraulic medium to lift the overburden and part the formation. The formation is retained in this fractured condition by introducing with the hydraulic fluid propping agents in the form of small inert solid particles, such as sand. While the use of these propping agents is advantageous, formations have been successfully treated by means of hydraulic fracturing techniques without using propping materials.

Generally the foregoing techniques have been separately applied to either calcareous or siliceous geological formations to produce effective increases in production rates of formations. Where particularly demanding situations have been encountered, it has been found expedient to resort to a combination of a physical method, such as shooting or hydraulically fracturing formations, with the chemical method, namely, acidizing, carried out in that order. For example, it has been suggested in the treatment of tight formations that the introduction of the acidizing reagent into the formation may be facilitated by initially employing a physical method to establish small crevices in the formation. In treating calcareous formations an acidizing reagent, such as hydrochloric acid, reactive with the calcareous constituents of the formation is used. In treating siliceous formations with this coordinated method it has been found that the use of aqueous solutions of fluophosphoric acid may be advantageously employed to disintegrate chemically the siliceous components of the formation. Such a method is described in United States Patent No. 2,664,165. In each instance, however, the acidizing phase of the treatment which followed the fracture-producing step has been the primary phase and the fracturing step employed had merely a secondary objective serving to enhance the efficiency of the acidizing treatment. It has been found, however, that the converse may also be carried out and the efficiency of the fracturing of siliceous geological formations by the use of hydraulic fluids may be improved by initially contacting the siliceous formation to be fractured with aqueous solutions of fluophosphoric acid.

It is therefore an object of this invention to stimulate the productivity of siliceous subterranean fluid producing reservoirs by means of an integrated process involving the sequential and separate use of an acidizing reagent and hydraulic fracturing, respectively. These and other objects will become apparent from the following detailed description of the invention.

In United States Patent Number 2,664,398, there is disclosed and claimed a method for decreasing the resistance of siliceous formations to the flow of fluids therethrough by contacting said formations with an aqueous solution of a fluophsphoric acid. It has also been found that the effectiveness of these acids can be increased by various manipulative techniques which are used in the introduction of the acid into the borehole. For example, the initial use of dilute solutions of fluophosphoric acid, followed thereafter by increasing the concentration of the treating reagent until a 50% solution of fluophosphoric acid is being utilized, is more effective than the use of the more concentrated and reactive solutions from the outset of the acidizing procedure. This technique is described and claimed in U. S. Patent 2,742,092.

Although the pressure parting phenomenon has long been recognized, the process did not assume a position of commercial importance as a means for increasing the productivity of fluid-containing reservoirs until the development of the so-called Hydrafrac process in which a viscous, gelatinous hydraulic fluid is employed. This process has been given considerable attention in the periodical and patent literature. An early but complete description is found in an article entitled A hydraulic process for increasing the productivity of wells, Journal of Petroleum Technology, 1 (1) T. P. 2510. Further details of the process are also given in United States Patents 2,596,844 and 2,596,845. The process in brief consists in the introduction into a formation of a viscous fracturing medium which, although very viscous, is pumpable. The hydraulic fluid is generally prepared by admixing a gelling agent to a liquid, such as a crude or refined petroleum oil. One such gelling agent which has had wide application because of its availability and economical cost is a mixture of aluminum soaps of coconut oil acids, naphthenic acids, and oleic acids. A sufficient amount of this soap, generally from about 1 to 10%, is added to the liquid vehicle to produce a gel which is satisfactory for use as a hydraulic fluid in the pressure parting of formations. After the gel is introduced into the formation, sufficient pressure is exerted by means of heavy duty high pressure pumps through this hydraulic medium in order to overcome the overburden pressure and fracture the formation. It is reported that the formation breakdown pressure is approximately equivalent in pounds per square inch to the depth of the formation in feet. This, however, is only a rule of thumb and more detailed information on this phase of the process is available in the aforementioned literature. After a sufficient pressure has been exerted within the formation to effect its fracture, the gelled hydraulic fluid is contacted with a peptizing agent to convert the hydraulic fluid from the gel to the sol state in order to facilitate its removal from the formation. Various materials, such as water, amines, sulfonates, and inorganic acids, may be used as the peptizing agent. The foregoing method, which has been considered in some detail, represents only one of the successful hydraulic fracturing techniques which are available. Commercial well treating establishments have a plurality of processes to choose from which differ primarily in the hydraulic fluid which is employed in the hydraulic fracturing technique. For example, in the so-called Stratafrac process a mineral acid, such as hydrochloric, which has been gelled by adding a material such as gelatin, saponin, or gum arabic, is employed. This process has an advantage in that no gel breaker is required. The gelled acid reverts of its own accord to the sol state and returns readily to the well bore as a thin, easy flowing liquid. Another modification of the hydraulic fracturing technique employs simply an admixture of a viscous petroleum fraction, such as an asphaltic residual petroleum oil in the nature of a road oil and a finely divided sand, the latter component functioning as a propping agent to assist in retaining the formation in the fractured state once this condition has been obtained. The mineral oil base of the hydraulic fluid in general has an API gravity of about 12° to 15° and a Saybolt Furol viscosity of about 45 to 300 sec. The oil also contains about 50 to 70% of 100 penetration asphalt.

As it has been pointed out above, where the use of hydraulic fracturing does not produce the desired effect on fluid producing formations, it may be relegated to a secondary position where it is used to enhance the efficiency of acidizing processes. According to this invention, however, it has been found that acidizing techniques using aqueous solutions of fluophosphoric acid may be used to facilitate the application of hydraulic fracturing principles where the primary objective is to provide drainage channels which radially extend from boreholes traversing a slightly permeable, fluid-bearing geological siliceous formation by means of hydraulic fracturing. The effectiveness of the instant invention was shown in the treatment of a siliceous oil-bearing reservoir in the South Glenrock Field, owned by the Far West Oil Company and located in Converse County, Wyoming. This formation, which is a Dakota sand, had an average permeability of 6 millidarcies and an average porosity of 10%. When the well initially began to flow, the oil production rate was about 125 barrels per day. However, over a two-year period the production declined to about 22 barrels per day. As a result of this decline, an attempt was made to stimulate the productivity of the reservoir by the use of the hydraulic fracturing technique. On this occasion pressure was exerted employing a viscous gel as the hydraulic fluid. However, no positive effect was evinced and the production rate remained at 22 barrels per day. Subsequently the reservoir was subjected to the integrated process of this invention wherein the same formation which had been previously subjected to the forces exerted by the hydraulic fracturing techniques was initially contacted with an aqueous solution of a difluophosphoric acid employing conventional acidizing techniques well known in the prior art. This treatment was followed by the pressurized injection of a hydraulic fluid in the form of an asphaltic residual oil having admixed therewith a quantity of a siliceous propping agent. The hydraulic fracturing phase of the treatment was effected using a standard manipulative procedure. As a result of this combination treatment the oil production of the formation was increased to about 60 barrels per day, an increase of about 272%. The resulting gain in the production must be attributed to the combined application of acidizing and hydraulic fracturing because in the interval occurring after the application of the acidizing technique to the formation and prior to the introduction of the hydraulic fluid into the formation, no enhancement in the productiveness of the formation was observed.

The foregoing example is only illustrative of the principles of the instant invention. For example, various modifications of the fluophosphoric acidizing technique previously considered can be employed. However, it is preferable that the acidizing phase of the process of this invention be carried out by initially injecting a solution of fluophosphoric acid having a concentration of about 5 to 10% into the formation and thereafter incrementally increasing the concentration until a concentration of about 50% by weight, which provides maximum reactivity, is being employed. Similarly the several exemplary hydraulic fracturing techniques hereinbefore described may be used to carry out the hydraulic fracturing phase of the process.

In determining the details of the different treating phases of this invention, it is evident that a number of variables are involved and must be considered, such as thickness and permeability of the exposed producing formation, lithological characteristics of the formation, well depth, weight, compressibility and strength of the overburden, bottom hole pressure, type of hydraulic fluid, etc. The permeability characteristics of the formation are an important aspect, inasmuch as the process of this invention has application in the treatment of slightly permeable formations having a permeability of not greater than about 10 millidarcies and is particularly useful in the treatment of formations having less than 1 millidarcy. As an example of the amounts of treating substances that were employed in treating the aforementioned South Glenrock Field reservoir, owned by the Far West Oil Company, which has a 24 foot producing section which had been isolated using suitable packing devices, a total of 3,250 gallons of aqueous fluophosphoric acid solution were used. In the hydraulic fracturing phase of the process, an admixture of 3,500 pounds of sand contained in 3,000 gallons of an asphaltic residual oil was employed as the hydraulic fluid. Depending upon the lithological characteristics of the formation to be treated, about 50 to 200 gallons of acid per foot of formation thickness may be used, although it may be necessary to employ amounts outside of this range. The amount of hydraulic fluid, in addition to being dependent upon the nature of the formation being treated, will also depend upon the type of hydraulic fluid which is being employed. Although quantities in excess of these amounts may be employed, it has been found that generally from about 50 to about 1,000 gallons or more of the hydraulic fluid are employed.

It is to be understood that the foregoing examples and suggested modifications thereof are simply illustrative and non-limiting. While these examples demonstrate the effectiveness of the use of the instant invention in the production of oil, the invention also has application in the recovery of other fluids, such as water and gas, which may be contained in subterranean reservoirs which are susceptible to treatment by the process of this invention. The process, of course, has additional ramifications which should be obvious to those skilled in the art who use the subject invention and any such modifications are intended to come within the scope of the following claims.

We claim:

1. An integrated process for improving the fluid flow characteristics and productivity of a siliceous geological formation having a permeability not greater than about 10 millidarcies traversed by a borehole which comprises initially contacting said formation with an aqueous solution having a fluophosphoric acid concentration of about 5–10% by weight in an amount sufficient to react therewith, and thereafter utilizing an aqueous fluophosphoric acid solution having a concentration in excess of that acid concentration initially employed in an amount sufficient to react further with the formation and subsequently forcing into the formation a viscous hydraulic fracturing fluid selected from the group consisting of an aluminum soap-petroleum hydrocarbon colloidal gel, a gelled mineral acid, and an asphaltic residual petroleum oil, and applying pressure to said fluid to produce within the formation a pressure sufficient to fracture said formation.

2. A method in accordance with claim 1 in which a granular propping agent is forced into said formation concomitant with the injection of said hydraulic fluid.

3. An integrated process for improving the fluid flow characteristics and productivity of a siliceous geological formation having a permeability not greater than about 10 millidarcies traversed by a borehole which comprises initially contacting said formation with an aqueous solution having a fluophosphoric acid concentration of about 5–10% by weight in an amount sufficient to react therewith, and thereafter utilizing an aqueous fluophosphoric acid solution having a concentration in excess of that acid concentration initially employed in an amount sufficient to react further with the formation and subsequently forcing into the formation a viscous asphaltic residual petroleum oil fracturing fluid having suspended therein a siliceous propping agent and applying pressure to said hydraulic fluid to produce within the formation a pressure sufficient to fracture said formation, and producing the well.

4. A process in accordance with claim 1 in which the acid concentration of the aqueous solution of fluophosphoric acid employed in said contacting is incrementally increased until a concentration of about 50% by weight of fluophosphoric acid is being employed.

5. A process in accordance with claim 1 in which 50–200 gallons of aqueous solution of fluophosphoric acid per foot of formation thickness is employed.

References Cited in the file of this patent

UNITED STATES PATENTS

| | | |
|---|---|---|
| 2,547,778 | Reistle | Apr. 3, 1951 |
| 2,596,843 | Farris | May 13, 1952 |
| 2,664,165 | Bond | Dec. 29, 1953 |
| 2,672,936 | Bond | Mar. 23, 1954 |

OTHER REFERENCES

Petroleum Engineer, vol. 23, No. 11, October 1951, pages B53, 54, and 56.